Patented Sept. 20, 1932

1,878,852

UNITED STATES PATENT OFFICE

ERNST FRITZ HÖPPLER AND JULIUS WALTER HAAKE, OF DRESDEN, GERMANY, ASSIGNORS TO THE FIRM HENKEL & CIE. GESELLSCHAFT MIT BESCHRANKTER HAFTUNG, OF DUSSELDORF, GERMANY, A CORPORATION OF GERMANY

METHOD OF PRODUCING POWDEROUS SWELLING STARCHES ADAPTED TO FORM AN ADHESIVE WHEN MIXED WITH COLD WATER

No Drawing. Application filed July 3, 1930, Serial No. 465,778, and in Germany November 28, 1927.

Applications have been filed in Germany Nov. 28, 1927, and Dec. 10, 1928.

The hitherto known methods of producing powderous starch preparations adapted to form pastes or glues when mixed with cold water, consist mainly in forming a pap by mixing starch with water and chemical substances, spreading the resulting pap on hot rolls or plates in the form of a thin layer and drying same. This treatment, however, has the severe drawback that at least 50% of the water in the charge must be removed during the drying process.

According to the present invention the said drawback is avoided by applying a mechanical pressure to the starch during the heating process. In this case it is not at all necessary to add water to commercial crude starch in order to convert the same into starch glue, because the grains will be completely broken up without any addition of water.

Example

Commercial, powderous potato starch or maize-or rice-starch in the form of crumbs is spread in a layer having a thickness of about 10 mm. between two faces of any desired form which are heated to a temperature of about 140-160° C. and the said faces are for a period of about 5 seconds subjected to a pressure of about 2500 kg/cm². By this treatment the originally loose starch will be converted into a coherent mass. According whether the material is treated continuously or interruptedly the mass will take up the form of ribbons or flat cakes. After the product has been ground a powderous swelling starch preparation is obtained, which when mixed with cold water will form a paste or glue.

By varying the three factors, i. e. the pressure, the heat and the duration of the heat treatment it is possible to produce swelling starches of different properties. The treatment may also be simplified with respect to the said three factors by adding chemical substances adapted to lower the temperature at which the starch is converted into starch glue. Suitable substances of this kind are, for instance, organic crystalloids, such as urea, derivates of urea, chloral hydrate and the like. These substances are suitably dissolved in organic solvents, which are miscible with water. Other suitable substances are rhodan salts, halogen calcium compounds and the like.

The obtained powderous starch preparation is extremely active. By adding chemical substances in a manner known per se, it is possible to produce vegetable glues and pastes in the form of powder and of widely different properties. By adding salts, such as carbonates, borates and the like or alkaline or acid substances it is, for instance, possible to produce preparations which vary widely with respect to consistency and other properties and which may be adapted for the most different purposes. By adding a disintegrating agent to the starch a more or less light flowing consistency of the product may be obtained when this is stirred in water, and by adding starch coagulating agents an extremely high viscous consistency may be created.

The novel method may be carried out either continuously or interruptedly with equally good results.

Instead of starch other substances of similar or related nature may be used as base material in the process. It is therefore to be understood, that the terms starch substance and starch substances, as used in the appended claims, are meant to cover not only starch but all starch preparations and starch containing or starch resembling materials or substances.

We claim:

1. A method of producing swelling starches and similar products adapted to swell with cold water, consisting in heating thin layers of starch containing the normal proportion of water for a short period between two faces at temperatures above 100° C. and simultaneously applying to same a mechanical pressure of about 2500 kg/cm².

2. A method of producing swelling starches and similar products adapted to swell with cold water, consisting in heating thin layers of starch containing the normal proportion of water for a short period between two faces at a temperature of about 140–160° C. and simultaneously applying a pressure of about 2500 kg/cm² to the same.

In testimony whereof we have hereunto set our hands.

ERNST FRITZ HÖPPLER.
JULIUS WALTER HAAKE.